(12) United States Patent
Guay et al.

(10) Patent No.: US 10,885,708 B2
(45) Date of Patent: Jan. 5, 2021

(54) AUTOMATED COSTUME AUGMENTATION USING SHAPE ESTIMATION

(71) Applicants: Disney Enterprises, Inc., Burbank, CA (US); ETH Zurich, Zurich (CH)

(72) Inventors: Martin Guay, Zurich (CH); Gökcen Cimen, Zurich (CH); Christoph Maurhofer, Hinwil (CH); Mattia Ryffel, Bern (CH); Robert W. Sumner, Zurich (CH)

(73) Assignees: Disney Enterprises, Inc., Burbank, CA (US); ETH ZURICH, Zurich (CH)

( * ) Notice: Subject to any disclaimer, the term of this patent is extended or adjusted under 35 U.S.C. 154(b) by 18 days.

(21) Appl. No.: 16/162,160

(22) Filed: Oct. 16, 2018

(65) Prior Publication Data
US 2020/0118333 A1 Apr. 16, 2020

(51) Int. Cl.
*G06T 19/00* (2011.01)
*G06T 7/73* (2017.01)
*G06N 3/02* (2006.01)

(52) U.S. Cl.
CPC .............. *G06T 19/00* (2013.01); *G06N 3/02* (2013.01); *G06T 7/75* (2017.01); *G06T 2207/20044* (2013.01); *G06T 2207/20084* (2013.01)

(58) Field of Classification Search
CPC ......... G06T 19/00; G06T 19/006; G06T 7/75; G06T 2207/20084; G06T 2207/20044; G06N 3/02
See application file for complete search history.

(56) References Cited

U.S. PATENT DOCUMENTS

| | | | |
|---|---|---|---|
| 9,142,056 B1* | 9/2015 | Baran | G09G 5/026 |
| 2013/0093788 A1* | 4/2013 | Liu | H04N 5/272 345/633 |
| 2013/0271458 A1* | 10/2013 | Andriluka | G06T 7/55 345/420 |

(Continued)

OTHER PUBLICATIONS

Ching-Hang Chen, "3D Human Pose Estimation=2D Pose Estimation+ Matching", Apr. 2017, pp. 1-9 (Year: 2017).*

(Continued)

*Primary Examiner* — Michael Le
(74) *Attorney, Agent, or Firm* — Farjami & Farjami LLP

(57) ABSTRACT

An automated costume augmentation system includes a computing platform having a hardware processor and a system memory storing a software code. The hardware processor executes the software code to provide an image including a posed figure to an artificial neural network (ANN), receive from the ANN a 2D skeleton data including joint positions corresponding to the posed figure, and determine a 3D pose corresponding to the posed figure using an optimization algorithm applied to the skeleton data. The software code further identifies one or more proportion(s) of the posed figure based on the skeleton data, determines bone directions corresponding to the posed figure using another optimization algorithm applied to the 3D pose, parameterizes a costume for the posed figure based on the 3D pose, the proportion(s), and the bone directions, and outputs an enhanced image including the posed figure augmented with the fitted costume for rendering on a display.

20 Claims, 6 Drawing Sheets

(56) References Cited

U.S. PATENT DOCUMENTS

2014/0168217 A1* 6/2014 Kim .................. G06Q 30/0643
345/420

OTHER PUBLICATIONS

Shan Yang, "Detailed Garment Recovery from a Single-View Image", Sep. 2016, pp. 1-13 (Year: 2016).*
Dushyant Mehta, "Monocular 3D Human Pose Estimation in the Wild Using Improved CNN Supervision" Oct. 2017, pp. 1-16 (Year: 2017).*
Deepak Pathak, "Context Encoders: Feature Learning by Inpainting", Nov. 2016, pp. 1-12 (Year: 2016).*
Yasin et al, "3D Pose Estimation from a Single Monocular Image", ISSN 2015, pp. 1-13.
Tsung-Yi Lin, "Microsoft COCO: Common Objects in Context", Feb. 21, 2015, pp. 1-15.
Chunyu Wang, "Robust Estimation of 3D Human Poses from a Single Image", Jun. 2014, pp. 1-9.
Deepak Pathak, "Context Encoders: Feature Learning by Inpainting", Nov. 2016, pp. 1-12.
Shan Yang, "Detailed Garment Recovery from a Single-View Image", Sep. 2016, pp. 1-13.
Zhe Cao, "Realtime Multi-Person 2D Pose Estimation using Part Affinity Fields", Apr. 2017, pp. 1-9.
Dushyant Mehta, "Monocular 3D Human Pose Estimation in TheWild Using Improved CNN Supervision" Oct. 2017, pp. 1-16.
Ching-Hang Chen, "3D Human Pose Estimation=2D Pose Estimation+ Matching", Apr. 2017, pp. 1-9.
Julieta Martinez, "A simple yet effective baseline for 3d human pose estimation", Aug. 2017, pp. 1-10.
Zintong Han, "VITON: An Image-based Virtual Try-on Network", Jun. 2018, pp. 1-19.
Angjoo Kanazawa, "End-to-end Recovery of Human Shape and Pose" Jun. 2018, pp. 1-10.
Jiahui Yu, "Generative Image Inpainting with Contextual Attention", Mar. 2018, pp. 1-15.
Riza Alp Guler, "DensePose: Dense Human Pose Estimation in TheWild", Feb. 2018, pp. 1-12.
Christian Zimmermann, "3D Human Pose Estimation in RGBD Images for Robotic Task Learning", Mar. 2018, pp. 1-7.
Wei Yang, "3D Human Pose Estimation in the Wild by Adversarial Learning", Apr. 2018, pp. 1-10.
Guilin Liu, "Image Inpainting for Irregular Holes Using Partial Convolutions" Dec. 2018, pp. 1-23.
Patrick Perez, "Poisson Image Editing", 2003, pp. 313-318.
Criminisi, "Region Filling and Object Removal by Exemplar-Based Image Inpainting", Sep. 2004, pp. 1-13.
Soheil Darabi, "Image Melding: Combining Inconsistent Images using Patch-based Synthesis" , 2012, pp. 1-10.
Felix Klose, "Sampling Based Scene-Space Video Processing", 2015, pp. 1-11.
Istvan Barakonyi, "Ubiquitous Animated Agents for Augmented Reality", 2006, pp. 1-10.
Zongben Xu, "Image Inpainting by Patch Propagation Using Patch Sparsity", May 2010, pp. 1-13.
Mykhaylo Andriluka, "2D Human Pose Estimation: New Benchmark and State of the Art Analysis", 2014, pp. 1-8.
H. Haggag, "An Adaptable System for RGB-D based Human Body Detection and Pose Estimation: Incorporating Attached Props", 2016, pp. 1-6.
Lorenz Rogge, "Garment Replacement in Monocular Video Sequences", Nov. 2014, pp. 1-10.
Dragomir Anguelov, "SCAPE: Shape Completion and Animation of People", pp. 1-9.
Gokcen Cimen, "AR Poser: Automatically Augmenting Mobile Pictures with Digital Avatars Imitating Poses", pp. 1-5.
Marcelo Bertalmio, "Image Inpainting", pp. 1-8.
Oliver Whyte, "Get Out of my Picture! Internet-based Inpainting", 2009, pp. 1-11.
Federica Bogo, "Keep it SMPL: Automatic Estimation of 3D Human Pose and Shape from a Single Image", pp. 1-18.
Dan A. Calian, "From Faces to Outdoor Light Probes" 2018, pp. 1-11.
Nikos Komodakis, "Image Completion Using Global Optimization" 2006, pp. 1-8.
Satoshi Iizuka, "Globally and Locally Consistent Image Completion" Jul. 2017, pp. 1-14.
Carsten Rother, ""GrabCut"—Interactive Foreground Extraction using Iterated Graph Cuts", pp. 1-6.
Peng Guan, "Estimating Human Shape and Pose from a Single Image" pp. 1-8.
Gokcen Cimen, "Interacting with Intelligent Characters in AR", pp. 1-6.
Jamie Shotton, "Efficient Human Pose Estimation from Single Depth Images", 2012, pp. 1-21.
Ivan E. Sutherland, "A head-mounted three dimensional display", 1968, pp. 757-764.
Ana Javornik, "MagicFace: Stepping into Character through an Augmented Reality Mirror", 2017, pp. 4838-4849.
Shizhe Zhou, "Parametric Reshaping of Human Bodies in Images", pp. 1-10.
Rogge, "Monocular Pose Reconstruction for an Augmented Reality Clothing System", 2011, pp. 1-8.
James Hays, "Scene Completion Using Millions of Photographs", 2007, pp. 1-7.
Denis Tome, "Lifting from the Deep: Convolutional 3D Pose Estimation from a Single Image", pp. 2500-2509.
Ira Kemelmacher-Shlizerman."Transfiguring Portraits", pp. 1-8.
Mihai Zanfir, "Human Appearance Transfer", pp. 1-9.

* cited by examiner

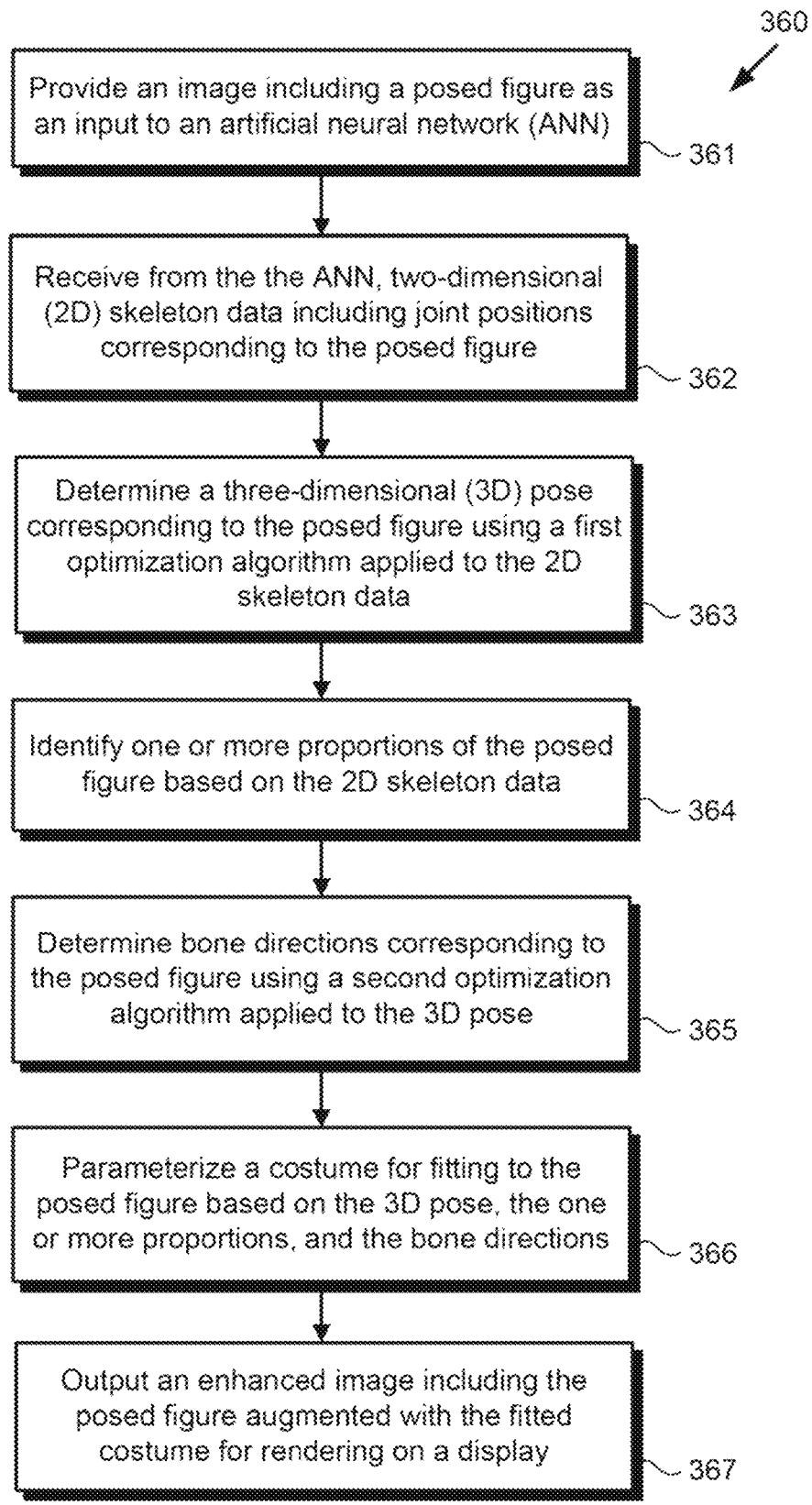

ns. As a result,
AUTOMATED COSTUME AUGMENTATION USING SHAPE ESTIMATION

BACKGROUND

Despite the widespread use of augmented reality (AR) techniques to enhance many real world objects with virtual imagery, obstacles remain to realistically augmenting the figure of a living body with virtual enhancements. For example, due to the ambiguities associated with depth projection, the variations in body shapes, and the variety of poses a body may assume, three-dimensional (3D) shape estimation of a body from a red-green-blue (RGB) image is an under-constrained and ambiguous problem. As a result, augmenting the image of a human body, for example, with a virtual costume that is realistically fitted to the 3D shape of the human body presents significant challenges.

Although solutions for estimating a 3D human pose exist, they are insufficient to the goal of matching the borders and contours of a digital costume augmentation to the 3D shape of the human figure assuming the pose. For instance, applying a digital costume to a human figure by merely overlaying the costume onto an image of the human figure based on 3D pose matching typically results in clothing or skin of the human model remaining visible.

SUMMARY

There are provided systems and methods for performing automated costume augmentation using shape estimation, substantially as shown in and/or described in connection with at least one of the figures, and as set forth more completely in the claims.

BRIEF DESCRIPTION OF THE DRAWINGS

FIG. 3 shows a flowchart presenting an exemplary method for performing automated costume augmentation, according to one implementation;

DETAILED DESCRIPTION

Figure 1:
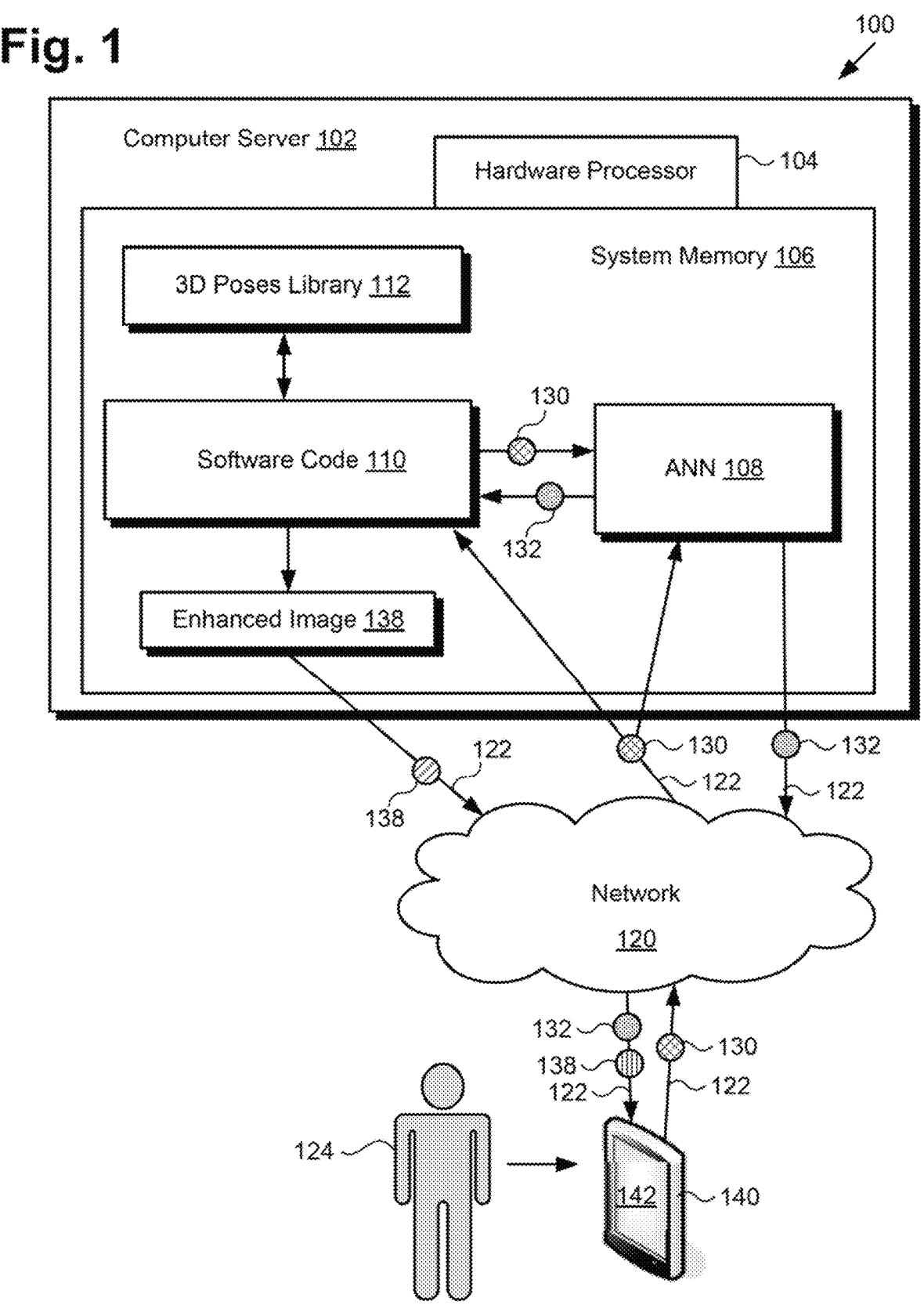
FIG. 1 shows a diagram of an exemplary system for performing automated costume augmentation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

It is noted that, as used in the present application, the terms "automation," "automated", and "automating" refer to systems and processes that do not require human intervention. Although, in some implementations, a human artist or editor may review or even modify a costume augmentation fitted by the automated systems and according to the automated methods described herein, that human involvement is optional. Thus, the methods described in the present application may be performed under the control of hardware processing components of the disclosed systems.

It is further noted that, as defined in the present application, an artificial neural network (ANN) is a machine learning engine designed to progressively improve its performance of a specific task. In various implementations, ANNs may be utilized to perform image processing or natural-language processing.

FIG. 1 shows a diagram of an exemplary system for performing automated costume augmentation, according to one implementation. As shown in FIG. 1, costume augmentation system 100 includes a computing platform in the form of computer server 102 having hardware processor 104, and system memory 106 implemented as a non-transitory storage device. According to the present exemplary implementation, system memory 106 stores software code 110, three-dimensional (3D) poses library 112, and ANN 108.

As further shown in FIG. 1, computer server 102 is implemented within a use environment including network 120, communication device 140 remote from computer server 102 (hereinafter "remote communication device 140") that includes display 142, and user 124 utilizing remote communication device 140. Also shown in FIG. 1 are network communication links 122 communicatively coupling remote communication device 140 to computer server 102 via network 120, image 130, two-dimensional (2D) skeleton data 132 generated by ANN 108, and enhanced image 138 output by software code 110.

It is noted that, although the present application refers to software code 110, 3D poses library 112, and ANN 108 as being stored in system memory 106 for conceptual clarity, more generally, system memory 106 may take the form of any computer-readable non-transitory storage medium. The expression "computer-readable non-transitory storage medium," as used in the present application, refers to any medium, excluding a carrier wave or other transitory signal that provides instructions to a hardware processor of a computing platform, such as hardware processor 104 of computer server 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

It is further noted that although FIG. 1 depicts software code 110, 3D poses library 112, and ANN 108 as being co-located in system memory 106, that representation is also provided merely as an aid to conceptual clarity. More generally, costume augmentation system 100 may include one or more computing platforms corresponding to computer server 102 and/or remote communication device 140, which may be co-located, or may form an interactively linked but distributed system, such as a cloud based system, for instance.

As a result, hardware processor 104 and system memory 106 may correspond to distributed processor and memory resources within costume augmentation system 100. Thus, it is to be understood that software code 110, 3D poses library 112, and ANN 108 may be stored and/or executed using the distributed memory and/or processor resources of costume augmentation system 100.

Costume augmentation system 100 provides an automated solution for enhancing image 130 including a posed figure by augmenting the posed figure with a virtual costume realistically fitted to the posed figure. Costume augmentation system 100 does so at least in part by using software code 110 to provide image 130 as an input to ANN 108 configured as a 2D skeleton estimation engine, and to receive 2D skeleton data 132 generated by ANN 108 based on image 130. Costume augmentation system 100 uses software code 110 to further determine a 3D pose corresponding to the posed figure based on 2D skeleton data 132.

Costume augmentation system 100 can then use software code 110 to estimate a 3D shape of the posed figure by identifying one or more proportions of the posed figure based on 2D skeleton data 132, and refine the 3D shape estimate by determining bone directions corresponding to the posed figure based on the 3D pose. Subsequently, a costume for fitting to the posed figure can be parameterized based on the 3D pose, the one or more proportions, and the bone directions, resulting advantageously in enhanced image 138 in which the fit of the costume to the posed figure is visually realistic.

Furthermore, in some implementations, costume augmentation system 100 may, after parameterizing the costume for fitting to the posed figure, use software code 110 to cover a body portion of the posed figure and an adjacent background portion of image 130 with a mask, leaving at least a head of the posed figure uncovered by the mask. In those implementations, costume augmentation system 100 may further use software code 110 to inpaint the mask to produce an inpainted mask having the background portion of image 130 restored, and overlay the inpainted mask with the costume to produce enhanced image 138. As a result, costume augmentation system 100 advantageously provides a fully automated solution for augmenting a posed figure with a virtual costume. These implementations and more are discussed in greater detail below.

Turning once again to the implementation shown in FIG. 1, user 124 may utilize remote communication device 140 to interact with computer server 102 over network 120. In one such implementation, computer server 102 may correspond to one or more web servers, accessible over a packet-switched network such as the Internet, for example. Alternatively, computer server 102 may correspond to one or more computer servers supporting a local area network (LAN), or included in another type of private or limited distribution network.

Although remote communication device 140 is shown as a personal communication device in the form of a smartphone or tablet computer in FIG. 1, that representation is also provided merely as an example. More generally, remote communication device 140 may be any suitable mobile or stationary computing device or system remote from computer server 102 storing ANN 108, and capable of performing data processing sufficient to provide a user interface, support connections to network 120, and implement the functionality ascribed to remote communication device 140 herein. For example, in other implementations, remote communication device 140 may take the form of a laptop computer, or a photo booth in a theme park or other entertainment venue, for example. In one implementation, user 124 may utilize remote communication device 140 to interact with computer server 102 to use software code 110, executed by hardware processor 104, to produce enhanced image 138.

It is noted that, in various implementations, enhanced image 138, when generated using software code 110, may be stored in system memory 106 and/or may be copied to non-volatile storage. Alternatively, or in addition, as shown in FIG. 1, enhanced image 138 may be sent to remote communication device 140 including display 142, for example by being transferred via network communication links 122 of network 120. It is further noted that display 142 may be implemented as a liquid crystal display (LCD), a light-emitting diode (LED) display, an organic light-emitting diode (OLED) display, or any other suitable display screen that performs a physical transformation of signals to light.

Figure 2:
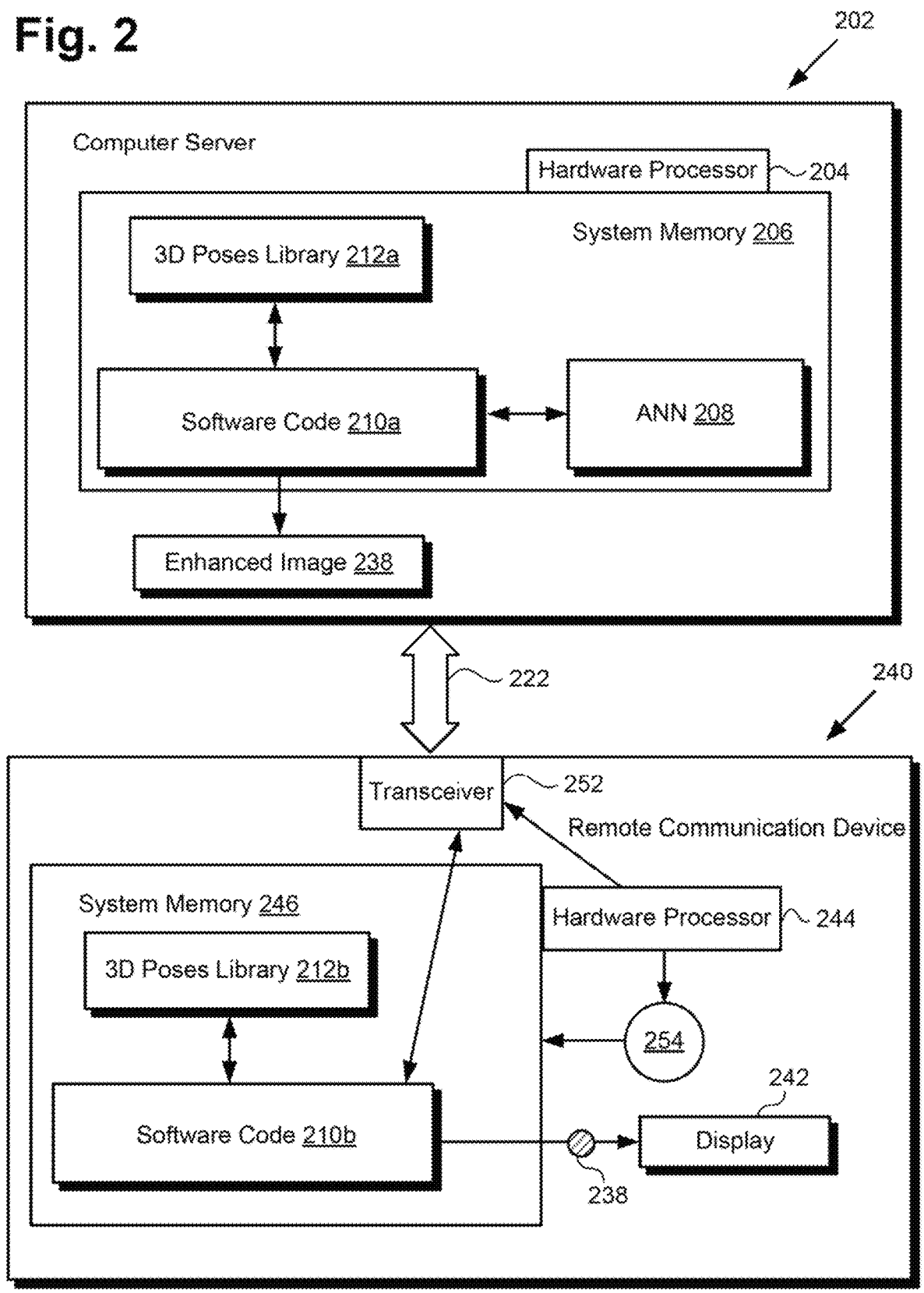
FIG. 2 shows a more detailed exemplary representation of a remote communication device suitable for use in performing automated costume augmentation, in combination with a computer server.

FIG. 2 shows a more detailed representation of exemplary remote communication device 240 in combination with computer server 202. As shown in FIG. 2, remote communication device 240 is communicatively coupled to computer server 202 over network communication link 222. Computer server 202 includes hardware processor 204, and system memory 206 storing software code 210a, 3D poses library 212a, and ANN 208.

As further shown in FIG. 2, remote communication device 240 includes hardware processor 244, system memory 246 implemented as a non-transitory storage device storing software code 210b and 3D poses library 212b. As also shown in FIG. 2, remote communication device 240 includes transceiver 252, camera 254, and display 242 receiving enhanced image 238.

Network communication link 222 and computer server 202 having hardware processor 204 and system memory 206, correspond in general to network communication link 122 and computer server 102 having hardware processor 104 and system memory 106, in FIG. 1. In addition, software code 210a, 3D poses library 212a, and ANN 208, in FIG. 2, correspond respectively in general to software code 110, 3D poses library 112, and ANN 108, in FIG. 1. In other words, software code 210a, 3D poses library 212a, and ANN 208 may share any of the characteristics attributed to respective software code 110, 3D poses library 112, and ANN 108 by the present disclosure, and vice versa. It is also noted that enhanced image 238, in FIG. 2, corresponds in general to enhanced image 138, in FIG. 1, and those corresponding features may share any of the characteristics attributed to either corresponding feature by the present disclosure.

Remote communication device 240 and display 242 correspond respectively in general to remote communication device 140 and display 142, in FIG. 1, and those corresponding features may share any of the characteristics attributed to either corresponding feature by the present disclosure. Thus, like remote communication device 140, remote communication device 240 may take the form of a smartphone, tablet or laptop computer, or a photo booth in a theme park or other entertainment venue. In addition, and although not shown in FIG. 1, remote communication device 140 may include features corresponding to hardware processor 244, transceiver 252, camera 254, and system memory 246 storing software code 210b and 3D poses library 212b. Moreover, like display 142, display 242 may be implemented as an LCD, an LED display, an OLED display, or any other suitable display screen that performs a physical transformation of signals to light.

With respect to software code 210b and 3D poses library 212b, it is noted that in some implementations, software code 210b may be an application providing a user interface for exchanging data with computer server 102/202, such as data corresponding to image 130 and enhanced image 138/238. In those implementations, system memory 246 of remote communication device 140/240 may not store 3D poses library 212b.

However, in other implementations, software code 210b may include all of the features of software code 110/210a, and may be capable of executing all of the same functionality. That is to say, in some implementations, software code 210b corresponds to software code 110/210a and may share any of the features and perform any of the processes attributed to those corresponding features by the present disclosure.

Furthermore, and as shown in FIG. 2, in implementations in which software code 210b corresponds to software code 110/210a, 3D poses library 212b may be stored locally on system memory 246 of remote communication device 140/240. It is also noted that, when present in system memory 246 of remote communication device 140/240, 3D poses library 212b corresponds in general to 3D poses library 112/212a and may share any of the characteristics attributed to those corresponding features by the present disclosure.

According to the exemplary implementation shown in FIG. 2, software code 210b and 3D poses library 212b are located in system memory 246, having been received via network communication link 122/222, either from computer server 102/202 or an authorized third party source of software code 210b and 3D poses library 212b. In one implementation, network communication link 122/222 corresponds to transfer of software code 210b and 3D poses library 212b over a packet-switched network, for example. Once transferred, for instance by being downloaded over network communication link 122/222, software code 210b and 3D poses library 212b may be persistently stored in system memory 246, and software code 210b may be executed on remote communication device 140/240 by hardware processor 244.

Hardware processor 244 may be the central processing unit (CPU) for remote communication device 140/240, for example, in which role hardware processor 244 runs the operating system for remote communication device 140/240 and executes software code 210b. As noted above, in some implementations, remote communication device 140/240 can utilize software code 210b as a user interface with computer server 102/202 for providing image 130 to software code 110/210a, and for receiving enhanced image 138/238 from software code 110/210a.

However, in other implementations, remote communication device 140/240 can utilize software code 210b to interact with computer server 102/202 by providing image 130 to ANN 108/208, and may receive 2D skeleton data 132 generated by ANN 108/208 via network 120. In those latter implementations, software code 210b may further produce enhanced image 138/238. Moreover, in those implementations, hardware processor 244 may execute software code 210b to render enhanced image 138/238 on display 142/242.

The functionality of software code 110/210a/210b will be further described by reference to FIG. 3. FIG. 3 shows flowchart 360 presenting an exemplary method for performing automated costume augmentation, according to one implementation. With respect to the method outlined in FIG. 3, it is noted that certain details and features have been left out of flowchart 360 in order not to obscure the discussion of the inventive features in the present application. It is further noted that the feature "computer server 102/202" described in detail above will hereinafter be referred to as "computing platform 102/202," while the feature "remote communication device 140/240" will hereinafter be referred to as "remote computing platform 140/240."

Regarding image 130, shown in FIG. 1, it is noted that image 130 may be a red-green-blue (RGB) image including a posed figure that is obtained by a digital camera, such as a digital still image camera for example. Alternatively, image 130 may be an RGB image taken from a video clip obtained by a digital video camera. In one implementation, image 130 may be a single monocular image including a posed figure portraying a human body in a particular posture or pose, for example.

In some implementations, hardware processor 244 of remote computing platform 140/240 may execute software code 210b to obtain image 130 using camera 254. Thus, camera 254 may be an RGB camera configured to obtain still or video digital images. In some implementations, image 130 may be transmitted by remote computing platform 140/240, using transceiver 252, to computing platform 102/202 via network 120 and network communication links 122/222. In those implementations, image 130 may be received by software code 110/210a, executed by hardware processor 104/204 of computing platform 102/202. However, in other implementations, image 130 may be received from camera 254 by software code 210b, executed by hardware processor 244 of remote computing platform 140/240.

Referring now to FIG. 3 in combination with FIGS. 1 and 2, flowchart 360 begins with providing image 130 including a posed figure as an input to ANN 108/208 (action 361). In implementations in which image 130 is received by software code 110/210a stored in system memory 106/206 also storing ANN 108/208, providing image 130 in action 361 may be performed as a local data transfer within system memory 106/206 of computing platform 102/202, as shown in FIG. 1. In those implementations, image 130 may be provided to ANN 108/208 by software code 110/210a, executed by hardware processor 104/204 of computing platform 102/202.

However, as noted above, in some implementations, image 130 is received by software code 210b stored in system memory 246 of remote computing platform 140/240. In those implementations, remote computing platform 140/240 is remote from ANN 108/208. Nevertheless, and as shown by FIG. 1, ANN 108/208 may be communicatively coupled to software code 210b via network 120 and network communication links 122/222. In those implementations, image 130 may be provided to ANN 108/208 via network 120 by software code 210b, executed by hardware processor 244 of remote computing platform 140/240, and using transceiver 252.

Flowchart 360 continues with receiving from ANN 108/208, 2D skeleton data 132 including multiple joint positions corresponding to the posed figure included in image 130 (action 362). ANN 108/208 may be configured as a deep neural network, as known in the art, which takes image 130 as input, and returns 2D skeleton data 132 including a list of joint positions $y_i$ corresponding to the posed figure included in image 130. ANN 108/208 may have been previously trained over a large data set of annotated images, for example, but may be implemented so as to generate 2D skeleton data 132 based on image 130 in an automated process.

In implementations in which image 130 is provided to ANN 108/208 by software code 110/210a, receiving 2D skeleton data 132 may be performed as a local data transfer within system memory 106/206 of computing platform 102/202, as shown in FIG. 1. In those implementations, 2D skeleton data 132 may be received from ANN 108/208 by software code 110/210a, executed by hardware processor 104/204 of computing platform 102/202.

However, in implementations in which image 130 is provided to ANN 108/208 from remote computing platform 140/240 by software code 210b, 2D skeleton data 132 may be received via network 120 and network communication links 122/222. As shown in FIG. 1, in those implementations, 2D skeleton data 132 may be received from remote ANN 108/208 via network 120 by software code 210b, executed by hardware processor 244 of remote computing platform 140/240, and using transceiver 252.

Flowchart 360 continues with determining a 3D pose corresponding to the posed figure included in image 130 using a first optimization algorithm applied to 2D skeleton data 132 (action 363). In one implementation, a 3D pose template may be dynamically resized and/or deformed and compared to 2D skeleton data 132 in a heuristic manner until a suitable match to skeleton data 132 is achieved. Alternatively, in some implementations, the 3D pose corresponding to the posed figure included in image 130 may be determined using the first optimization algorithm applied to 2D skeleton data 132 and one or more of the 3D poses stored in 3D poses library 112/212a/212b.

When determining the 3D pose corresponding to the posed figure included in image 130 using 3D poses library 112/212a/212b, 2D skeleton data 132 may be projected onto the 3D pose space defined by the 3D poses included in 3D poses library 112/212a/212b. For example, for each 3D pose in 3D poses library 112/212a/212b, the present solution may optimize for the rigid transformation that brings the 3D poses in 3D poses library 112/212a/212b closest to the projection of 2D skeleton data 132, in terms of joint positions similarity. In one implementation, the global transformation of a 3D pose may be parameterized with four degrees of freedom: one rotation around the y axis, together with three global translations, for example.

Formally, for each pose $X^k = \{x_i\}^k$ defined as a set of joint positions $x_i$, we can optimize for a reduced rigid transformation M composed of a rotation around the y axis ($R_y$), and three translations (T), resulting in $M = TR_y$. The rigid transformation M minimizes the similarity cost between the 3D projected joint positions P, M, $x_i$, and the 2D joint positions $y_i$, where P is a view and projection transformation of the camera used to obtain image 130. Finally, we analyze all the optimal transformation and pose pairs k, M, and identify the one that has the smallest cost value, resulting in the following optimization problem:

$$k^*, M^* = \operatorname*{argmin}_{k} \operatorname*{min}_{M} E_p = \sum_{i}^{|X^k|} \|y_i - PMx_i\|^2 \quad \text{(Equation 1)}$$

The optimization for the transformation M is solved using gradient-based optimization along numerical derivatives. This requires initializing the 3D pose front facing the camera so as to ensure convergence towards a sensible solution.

In implementations in which 2D skeleton data 132 is received from ANN 108/208 by software code 110/210a, determination of the 3D pose corresponding to the posed figure in image 130 may be performed by software code 110/210a, executed by hardware processor 104/204 of computing platform 102/202. However, in implementations in which 2D skeleton data is received from ANN 108/208 by software code 210b on remote computing platform 140/240, determination of the 3D pose corresponding to the posed figure in image 130 may be performed by software code 210b, executed by hardware processor 244 of remote computing platform 140/240.

Flowchart 360 continues with identifying one or more proportions of the posed figure included in image 130 based on 2D skeleton data 132 (action 364). Given the closest 3D pose k* determined in action 363, we seek to identify the closest matching proportions c* to better fit to 2D skeleton data 132. In some implementations, it may be advantageous or desirable to focus on proportions related to the shoulders and hips of the posed figure, which are usually more prominent, may yield better results perceptually, and are typically more robust pose and proportion pairs.

For example, in one implementation, the proportion features of interest f may include the shoulder-width to hip-width ratio $f_{s/w}$ and the shoulder-width to average upper body height ratio $f_{s/h}$ of the posed figure included in image 130. Here, the proportion features f may be expressed as $f = [f_{s/w}, f_{s/h}]$ where the shoulder-width to hip-width ratio is defined as:

$$f_{s/w} = \frac{|S_L - S_R|}{|H_L - H_R|}, \quad \text{(Equation 2)}$$

and the shoulder-width to average upper body height ratio is defined as:

$$f_{s/h} = \frac{2 \cdot |S_L - S_R|}{|S_L - H_L| + |S_R - H_R|}. \quad \text{(Equation 3)}$$

Here, $S_L$, and $S_R$ are the left and right shoulders and $H_L$ and $H_R$ are the left and right hips of the posed figure included in image 130 in 3D.

3D shape estimation may be performed by selecting the 3D shape c which has the closest proportion feature vector to the target 2D skeleton features $f_t$ when inverse projected onto a plane centered on a costume in 3D. For example, we may pick the shape c that minimizes the weighted sum at the L2 norm:

$$c^* = \operatorname*{argmin}_{c} \|w[f_t - f_c]^T\|^2, \quad \text{(Equation 4)}$$

where $w = [w_0, w_1]$ may both be equal to 1 in one implementation. It is noted that although there are a variety of different proportions in any given posed figure, such as a posed human figure, in some implementations, three modes ($|c| = 3$) is sufficient.

In implementations in which the 3D pose corresponding to the posed figure in image 130 is determined by software code 110/210a, identification of the one or more proportions in action 364 may be performed by software code 110/210a, executed by hardware processor 104/204 of computing platform 102/202. However, in implementations in which the 3D pose corresponding to the posed figure in image 130 is determined by software code software code 210b on remote computing platform 140/240, identification of the one or more proportions in action 364 may be performed by software code 210b, executed by hardware processor 244 of remote computing platform 140/240.

Flowchart 360 continues with determining bone directions corresponding to the posed figure included in image 130 using a second optimization algorithm applied to the 3D pose (action 365). It is noted that after completion of action 364 as described above, a 3D shape (pose k* and proportions c*) has been estimated what is close to the shape of the posed figure included in image 130, but may still differ in terms of bone orientation and joint position. To further improve the match between the estimated 3D shape and the shape of the posed figure included in image 130, we may perform an additional refinement with respect to the full degrees of freedom of the 3D shape, i.e., the joint orientations $Q=q_i$ and the root position $x_0$ of the posed figure in image 130.

Because bone positions may not match exactly, the objective in Equation 1 is weighted down and an additional objective function is added that seeks to match the bone directions, resulting in the following optimization:

$$Q^*, x_0^* = \min_{Q, x_0} w_p E_p + w_{dir} E_{dir}, \quad \text{(Equation 5)}$$

$$E_{dir} = \sum_i \|(y_i - y_{p(i)}) - (PM^* x_i - PM^* x_{p(i)})\|^2, \quad \text{(Equation 6)}$$

where p(i) is the parent of i.

The problem posed by Equations 5 and 6 may be solved in global/local fashion where we optimize for the global position while keeping the orientation fixed, and solve for the individual joint orientations while keeping the position fixed. Both steps may be performed using local gradient descent along numerical derivatives.

In implementations in which action 364 is performed by software code 110/210a, action 365 may be performed by software code 110/210a, executed by hardware processor 104/204 of computing platform 102/202. However, in implementations in which action 364 is performed by software code software code 210b on remote computing platform 140/240, action 365 may be performed by software code 210b, executed by hardware processor 244 of remote computing platform 140/240.

Figure 4A:
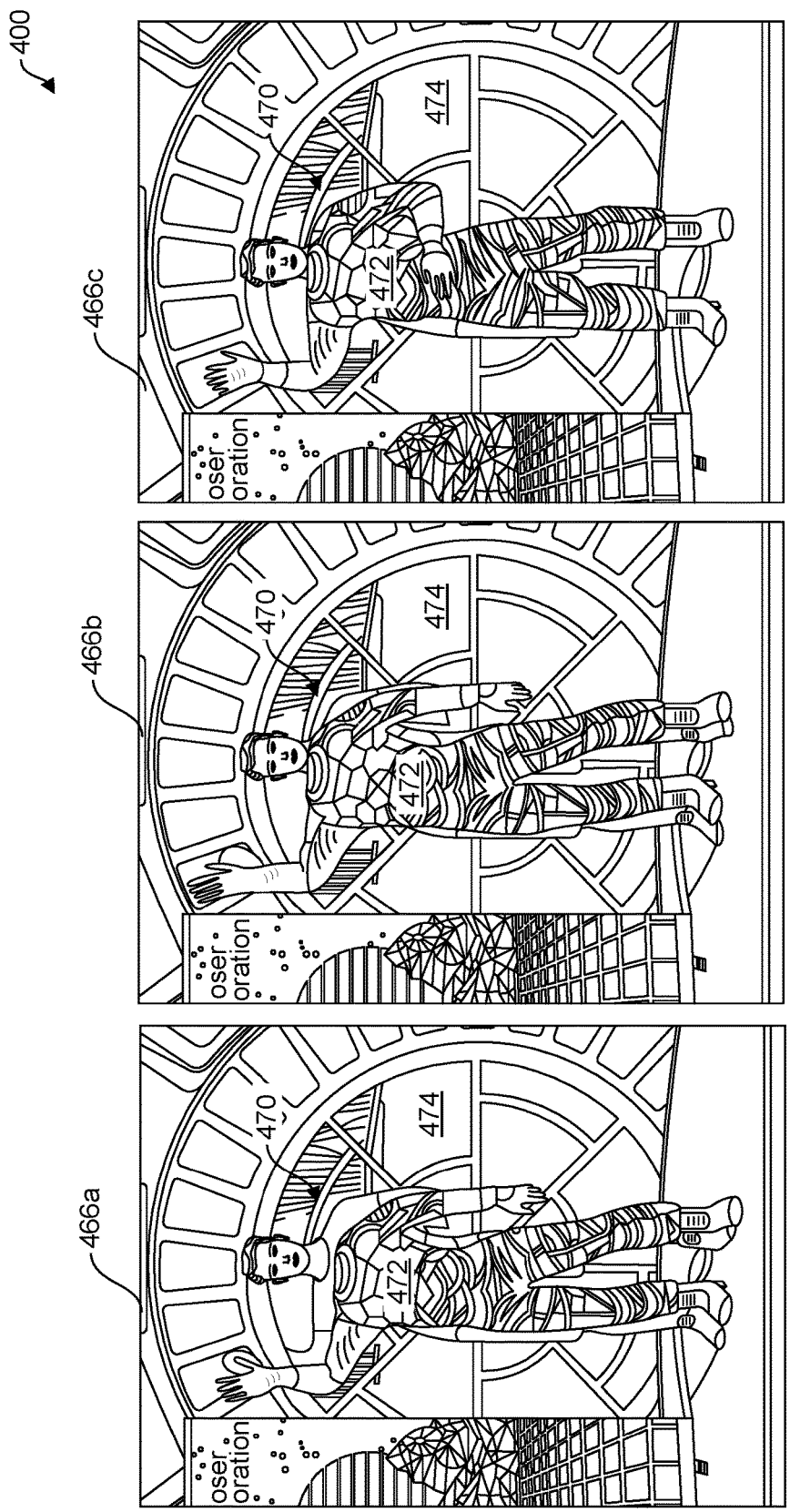
FIG. 4A shows an exemplary implementation of fitting a costume to a posed figure based on multiple shape estimation parameters.

Flowchart 360 continues with parameterizing a costume for fitting to the posed figure included in image 130 based on the 3D pose determined in action 363, the one or more proportions identified in action 364, and the bone directions determined in action 365 (action 366). Referring to FIG. 4A, image frames 400 show an exemplary implementation of fitting costume 472 to posed FIG. 470 based on multiple shape estimation parameters. Also shown in FIG. 4A is background 474 of image 130.

By way of example, image frame 466a may correspond to a fitting of costume 472 to posed FIG. 470 based on the 3D pose determination performed in action 363. Analogously, image frame 466b may correspond to adjustment of the fit of costume 472 in image frame 466a based on the 3D shape estimation of posed figured 470 that includes the one or more proportions identified in action 364. By further analogy, image frame 466c may correspond to refinement of the fit of costume 472 in image frame 466b based on the bone directions determined in action 365. It is noted that posed FIG. 470 of image frames 400 corresponds in general to the posed figure included in image 130. That is to say, image 130 may include posed FIG. 470, as well as background 474.

In implementations in which actions 363, 364, and 365 are performed by software code 110/210a, parameterization of costume 472 for fitting to posed FIG. 470 may be performed by software code 110/210a, executed by hardware processor 104/204 of computing platform 102/202. However, in implementations in which actions 363, 364, and 365 are performed by software code 210b on remote computing platform 140/240, parameterization of costume 472 for fitting to posed FIG. 470 may be performed by software code 210b, executed by hardware processor 244.

In some implementation, flowchart 360 can conclude with outputting enhanced image 138/238 including posed FIG. 470 augmented with costume 472 for rendering on display 142/242. In implementations in which costume 472 is parameterized for fitting to posed FIG. 470 by software code 110/210a, software code 110/210a may be further executed by hardware processor 104/204 of computing platform 102/202 to output enhanced image 138/238 by transmitting enhanced image 138/238 to remote computing platform 140/240 via network 120 and network communication links 122/222 for rendering on display 142/242.

However, in implementations in which costume 472 is parameterized for fitting to posed FIG. 470 by software code 210b, software code 210b may provide enhanced image 138/238 as an output. In those implementations, for example, hardware processor 244 may execute software code 210b to produce enhanced image 138/238, and may further execute software code 210b to render enhanced image 138/238 on display 142/242.

Figure 4B:
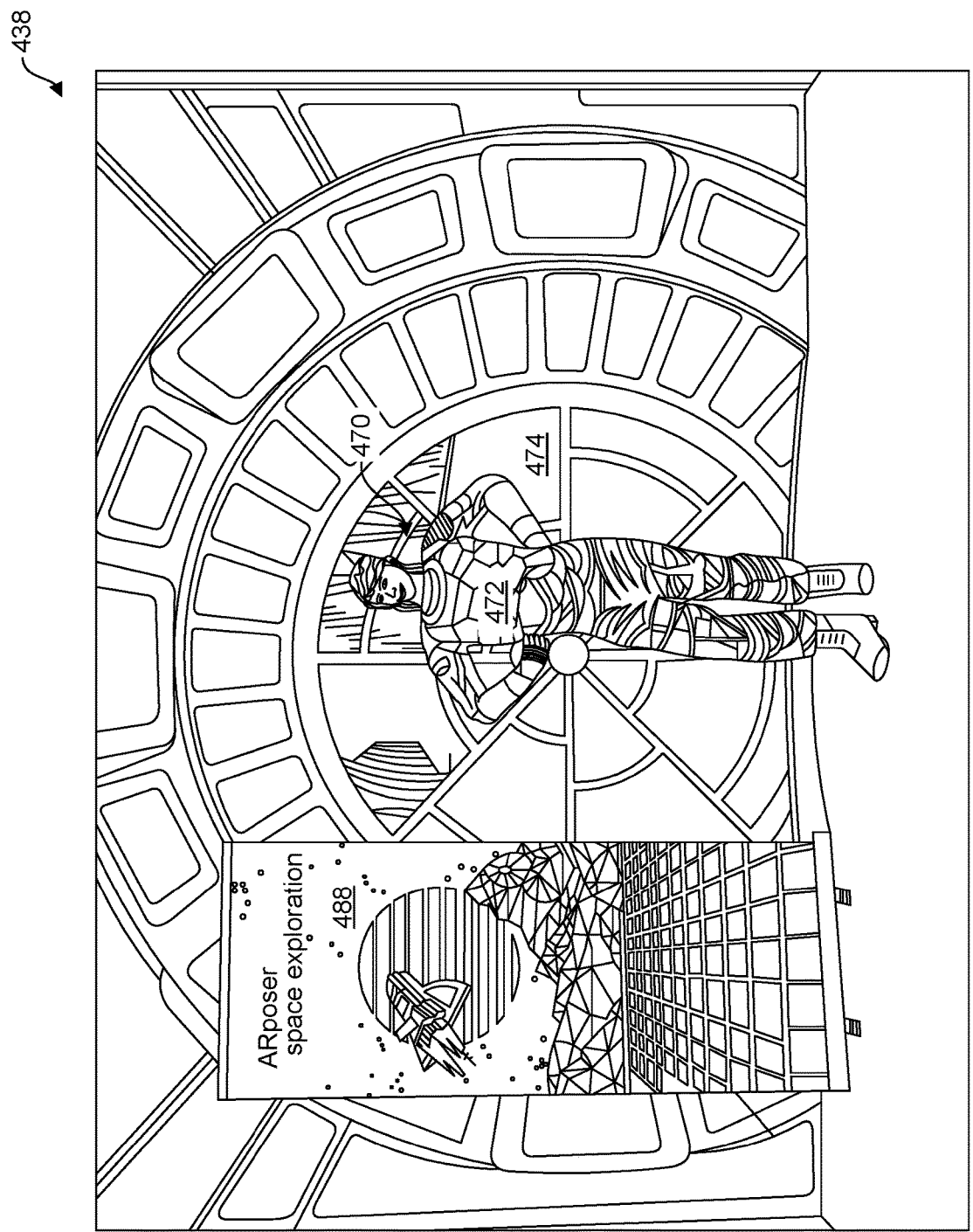
FIG. 4B shows an exemplary enhanced image including a posed figure augmented with a fitted costume, according to one implementation.

FIG. 4B shows exemplary enhanced image 438 including posed FIG. 470 augmented with fitted costume 472, according to one implementation. It is noted that enhanced image 438 corresponds in general to enhanced image 138/238 in FIGS. 1 and 2. That is to say, enhanced image 138/238 may share any of the characteristics attributed to enhanced image 438 by the present disclosure, and vice versa. Also shown in FIG. 4B is background 474 and marker 488 that can be utilized to recognize and track the transformations of the camera used to obtain image 130 on which enhanced image 138/238/438 is based.

Figure 5:
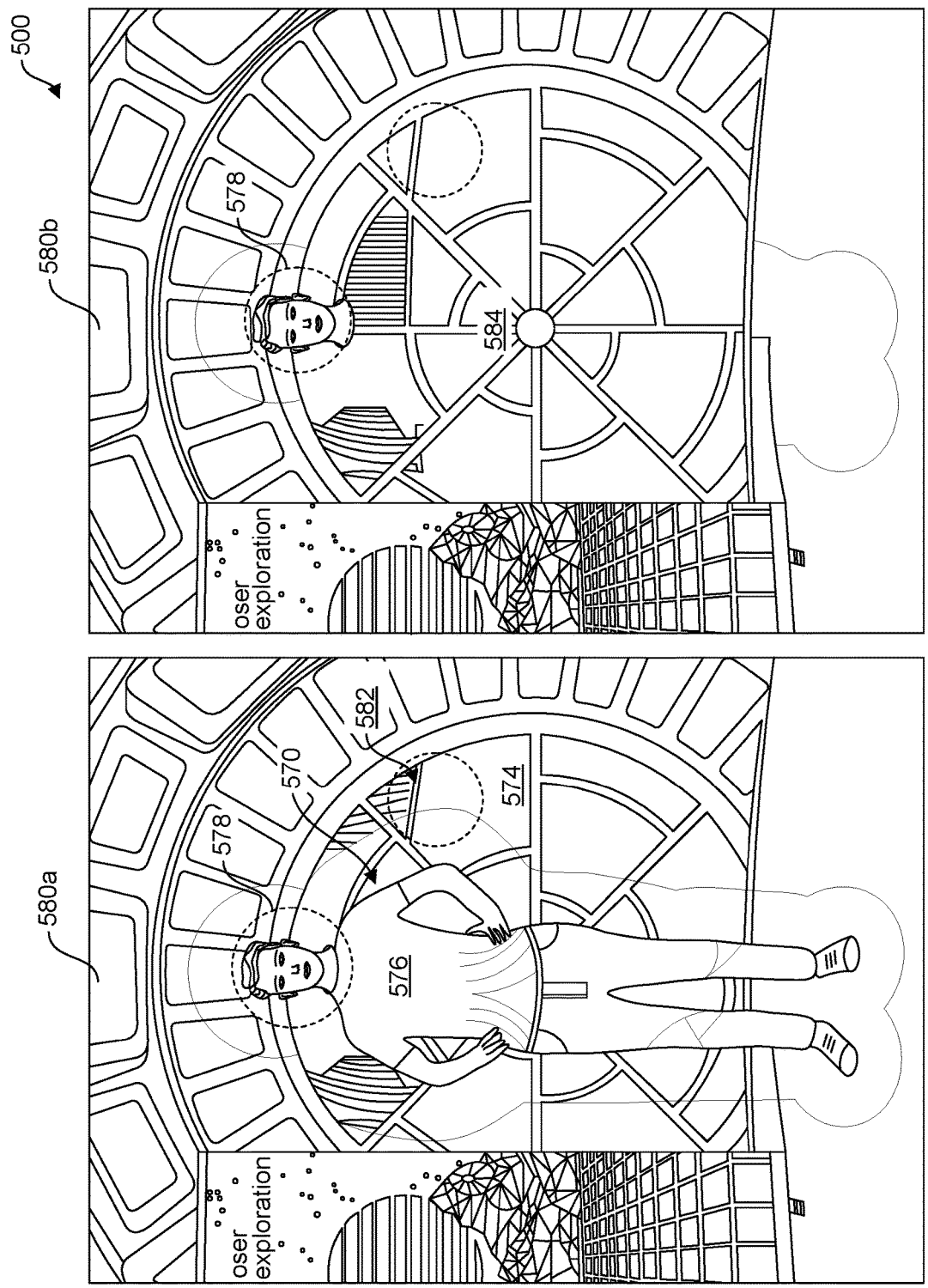
FIG. 5 shows an exemplary implementation of masking and inpainting an image as part of a process for performing automated costume augmentation.

Although not included in the outline provided by flowchart 360, in some implementations, a method for performing automated costume augmentation may further include covering a body portion of posed FIG. 470 and an adjacent portion of background 474 of image 130 with a mask, where at least the head of posed FIG. 474 is not covered by the mask. Referring to image frames 500, in FIG. 5, image frame 580a shows posed FIG. 570 having body portion 576 and head 578. Also shown in image frame 580a is mask 582 and background 574.

Posed FIG. 570 and background 574 correspond respectively in general to posed FIG. 470 and background 474 in FIGS. 4A and 4B. Thus, posed FIG. 570 and background 574 may share any of the characteristics attributed to posed FIG. 470 and background 474 by the present disclosure, and vice versa. As shown in image frame 580a of FIG. 5, mask 582 covers body portion 576 of posed FIG. 470/570 and a portion of background 474/574 adjacent to posed FIG. 470/570, while leaving head 578 of posed FIG. 470/570 uncovered.

To obtain mask 582, which may be a 2D mask for example, an image segmentation method such as GrabCut may be employed that requires an initial labelling of the foreground, and possibly foreground and background pixels. In one implementation, 2D skeleton data 132 may be used to set foreground pixels that are within a distance r of a few pixels of the joint positions, and within 2r of the skeleton bones, which are defined as lines between joints. For head 578, a slightly larger ellipse may be set to indicate the facial pixels in order to obtain a more precise boundary. Pixels within a larger radius may be marked as probably foreground, while the rest remain assumed background.

In implementations in which costume 472 is parameterized for fitting to posed FIG. 470/570 by software code 110/210a, software code 110/210a may be further executed by hardware processor 104/204 of computing platform 102/202 to cover body portion 576 of posed FIG. 470/570 and an adjacent portion of background 474/574 with mask 582. However, in implementations in which costume 472 is parameterized for fitting to posed FIG. 470/570 by software code 210b, hardware processor 244 of remote computing device 140/240 may execute software code 210b to cover body portion 576 of posed FIG. 470/570 and an adjacent portion of background 474/574 with mask 582.

Referring to image frame 580b, in some implementations, the present method may further include inpainting mask 582 to produce inpainted mask 584 having restored background portion 474/574 of image 130. In one implementation, inpainting of mask 582 may be based on a video capture of background 474/574 of image 130. For example, in one implementation, a projective transformation or Homography may be determined from the closest matching background with respect to camera parameters, to target image frame 580b, using four corresponding points in image 130 and enhanced image 138/238/438, for example, the four corners of marker 488 in FIG. 4B.

When capturing background 474/574, the position x and orientation q of the camera used to capture the reference video may be recorded. Given a new position x' and orientation q' of the camera used to obtain image 130, the reference dataset can be searched for the nearest background image. Given that nearest background image, we seek a warping function that maps coordinates x, y in the target image frame 580b to coordinates x", y" in the reference image. Consequently, we may track the four positions of the corners of marker 488 in the reference or source image $S_{1,2,3,4}$ and target image frame 580b $T_{1,2,3,4}$, and define a projection transformation by assembling:

$$W_S = S_{(1-3)}^{-1} \cdot S_4, \quad \text{(Equation 7)}$$

where $S_{(1-3)}$ is the 3×3 matrix concatenating the first three vectors in the source image as homogenous coordinates x, y, 1. The matrix resulting from multiplying $S_{(1-3)}$ by the vector $W_S$ is the transform that maps the source square to the canonical coordinates. As a result, we can transform from a target square of image frame 580b to the canonical space and to the reference or source via:

$$M = W_T \cdot T_{(1-3)} \cdot (W_S \cdot S_{(1-3)})^{-1}, \quad \text{(Equation 8)}$$

which for a given pixel coordinate x, y we obtain the intermediate coordinates:

$$[x'y'z'] = M \cdot [xy1]^T, \quad \text{(Equation 9)}$$

which require a final dehomogenization:

$$x'' = \frac{x'}{z'} \quad y'' = \frac{y'}{z'}. \quad \text{(Equation 10)}$$

Sampling pixels from this function yields similar color and structure, but does not ensure boundary smoothness and color consistency. Accordingly, we may further optimize the pixel values to blend with the target image by minimizing the target color gradient while preserving the source color gradient, i.e., using a method known as Poisson image editing.

In implementations in which software code 110/210a is executed by hardware processor 104/204 of computing platform 102/202 to cover body portion 576 of posed FIG. 470/570 and an adjacent portion of background 474/574 with mask 582, software code 110/210a may be further executed by hardware processor 104/204 to inpaint mask 582 to produce inpainted mask 584 having restored background 474/574. However, in implementations in which software code 210b is executed by hardware processor 244 of computing platform 140/240 to cover body portion 576 of posed FIG. 470/570 and an adjacent portion of background 474/574 with mask 582, software code 210b may be further executed by hardware processor 244 to inpaint mask 582 to produce inpainted mask 584 having restored background 474/574.

After inpainting mask 582 to produce inpainted mask 584 having restored background portion 474/574 of image 130, the present method may continue with overlaying inpainted mask 584 with costume 472 to produce enhanced image 138/238/438. In implementations in which software code 110/210a is executed by hardware processor 104/204 of computing platform 102/202 to produce inpainted mask 584, software code 110/210a may be further executed by hardware processor 104/204 to overlay inpainted mask with costume 472 to produce enhanced image 138/238/438. However, in implementations in which software code 210b is executed by hardware processor 244 of remote computing platform 140/240 to produce inpainted mask 584, software code 210b may be further executed by hardware processor 244 to overlay inpainted mask with costume 472 to produce enhanced image 138/238/438.

It is noted that in the various implementations described above, enhanced image 138/238/438 can be rendered on display 142/242 without substantial delay with respect to receipt of image 130 by software code 110/210a or 210b. For example, in some implementations, a time lapse between receiving image 130 by software code 110/210a or 210b and rendering enhanced image 138/238/438 on display 142/242 may be approximately ten seconds, or less.

Thus, the present application discloses an automated solution for augmenting a posed figure with a virtual costume, using shape estimation. The present solution does so at least in part by providing an image including the posed figure as an input to an ANN and receiving, from the ANN, 2D skeleton data including joint positions corresponding to the posed figure. The present solution also includes determining a 3D pose corresponding to the posed figure using a first optimization algorithm applied to the 2D skeleton data, and further estimating a 3D shape of the posed figure by identifying one or more proportions of the posed figure based on the 2D skeleton data. The estimated 3D shape can be refined by determining bone directions corresponding to the posed figure using a second optimization algorithm applied to the 3D pose. A costume for fitting to the posed figure can then be parameterized based on the 3D pose, the one or more proportions, and the bone directions, resulting advantageously in an enhanced image in which the fit of the costume to the posed figure is visually realistic.

In some implementations, the present solution may also include, after parameterizing the costume for fitting to the posed figure, covering a body portion of the posed figure and an adjacent background portion of the image with a mask, leaving at least a head of the posed figure uncovered by the mask. In those implementations, the present solution may further include inpainting the mask to produce an inpainted mask having the background portion of the image restored, and overlaying the inpainted mask with the costume to produce the enhanced image.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. An automated costume augmentation system comprising a computing platform including a hardware processor and a system memory storing a software code, the hardware processor configured to execute the software code to:
   determine a three-dimensional (3D) pose corresponding to a two-dimensional (2D) skeleton data including a plurality of joint positions corresponding to a posed figure in an image, using a first optimization algorithm applied to the 2D skeleton data, the first optimization algorithm including a first objective function;
   identify at least one proportion of the posed figure based on the 2D skeleton data;
   determine a plurality of bone directions corresponding to the posed figure, using a second optimization algorithm applied to the 3D pose, wherein the second optimization algorithm includes the first objective function summed with a second objective function configured to match the plurality of bone directions;
   parameterize a costume for fitting to the posed figure based on the 3D pose, the at least one proportion, and the plurality of bone directions; and
   output an enhanced image including the posed figure augmented with the costume fitted to the posed figure for rendering on a display.

2. The automated costume augmentation system of claim 1, further comprising a 3D poses library accessible by the software code, wherein the 3D pose corresponding to the posed figure is determined using the first optimization algorithm applied to the 2D skeleton data and a plurality of 3D poses stored in the 3D poses library.

3. The automated costume augmentation system of claim 1, wherein the at least one proportion of the posed figure includes at least one of a shoulder-width to hip-width ratio or a shoulder-width to average upper body height ratio of the posed figure.

4. The automated costume augmentation system of claim 1, wherein, after parameterizing the costume for fitting to the posed figure and before outputting the enhanced image, the hardware processor is further configured to execute the software code to:
   cover a body portion of the posed figure and an adjacent background portion of the image with a mask, wherein at least a head of the posed figure is not covered by the mask;
   inpaint the mask to produce an inpainted mask having a restored background portion of the image; and
   overlay the inpainted mask with the costume to produce the enhanced image.

5. The automated costume augmentation system of claim 1, wherein the image comprises a single monocular image.

6. The automated costume augmentation system of claim 1, wherein the computing platform is part of a personal communication device remote from an artificial neural network (ANN) generating the 2D skeleton data, the personal communication device further comprising the display and a camera.

7. The automated costume augmentation system of claim 6, wherein the hardware processor is further configured to execute the software code to obtain the image using the camera.

8. The automated costume augmentation system of claim 6, wherein the hardware processor is further configured to execute the software code to render the enhanced image on the display.

9. A method for use by an automated costume augmentation system including a computing platform having a hardware processor executing a software code stored in a system memory, the method comprising:
   determining a three-dimensional (3D) pose corresponding to a two-dimensional (2D) skeleton data including a plurality of joint positions corresponding to a posed figure in an image, using a first optimization algorithm applied to the 2D skeleton data, the first optimization algorithm including a first objective function;
   identifying at least one proportion of the posed figure based on the 2D skeleton data;
   determining a plurality of bone directions corresponding to the posed figure, using a second optimization algorithm applied to the 3D pose, wherein the second optimization algorithm includes the first objective function summed with a second objective function configured to match the plurality of bone directions;
   parameterizing a costume for fitting to the posed figure based on the 3D pose, the at least one proportion, and the plurality of bone directions; and
   outputting an enhanced image including the posed figure augmented with the costume fitted to the posed figure for rendering on a display.

10. The method of claim 9, wherein the automated costume augmentation system further comprises a 3D poses library accessible by the software code, wherein determining the 3D pose corresponding to the posed figure comprises applying the first optimization algorithm to the 2D skeleton data and a plurality of 3D poses stored in the 3D poses library.

11. The method of claim 9, wherein the at least one proportion of the posed figure includes at least one of a shoulder-width to hip-width ratio or a shoulder-width to average upper body height ratio of the posed figure.

12. The method of claim 9, wherein the method further comprises, after parameterizing the costume for fitting to the posed figure and before outputting the enhanced image:
   covering, by the software code executed by the hardware processor, a body portion of the posed figure and an adjacent background portion of the image with a mask, wherein at least a head of the posed figure is not covered by the mask;
   inpainting, by the software code executed by the hardware processor, the mask to produce an inpainted mask having a restored background portion of the image; and
   overlaying, by the software code executed by the hardware processor, the inpainted mask with the costume to produce the enhanced image.

13. The method of claim 9, wherein the image comprises a single monocular image.

14. The method of claim 9, wherein the computing platform is part of a personal communication device remote from an artificial neural network (ANN) generating the 2D skeleton data, the personal communication device further comprising the display and a camera.

15. The method of claim 14, further comprising obtaining the image using the camera.

16. The method of claim 14, further comprising rendering the enhanced image on the display.

17. A computer-readable non-transitory medium having stored thereon a software code including instructions, which when executed by a hardware processor, instantiate a method comprising:
  determining a three-dimensional (3D) pose corresponding to a two-dimensional (2D) skeleton data including a plurality of joint positions corresponding to a posed figure in an image, using a first optimization algorithm applied to the 2D skeleton data, the first optimization algorithm including a first objective function;
  identifying at least one proportion of the posed figure based on the 2D skeleton data;
  determining a plurality of bone directions corresponding to the posed figure, using a second optimization algorithm applied to the 3D pose, wherein the second optimization algorithm includes the first objective function summed with a second objective function configured to match the plurality of bone directions;
  parameterizing a costume for fitting to the posed figure based on the 3D pose, the at least one proportion, and the plurality of bone directions; and
  outputting an enhanced image including the posed figure augmented with the costume fitted to the posed figure for rendering on a display.

18. The computer-readable non-transitory medium of claim 17, wherein determining the 3D pose corresponding to the posed figure comprises applying the first optimization algorithm to the 2D skeleton data and a plurality of 3D poses stored in a 3D poses library accessible by the software code.

19. The computer-readable non-transitory medium of claim 17, wherein the at least one proportion of the posed figure includes at least one of a shoulder-width to hip-width ratio or a shoulder-width to average upper body height ratio of the posed figure.

20. The computer-readable non-transitory medium of claim 17, wherein the method further comprises, after parameterizing the costume for fitting to the posed figure and before outputting the enhanced image:
  covering a body portion of the posed figure and an adjacent background portion of the image with a mask, wherein at least a head of the posed figure is not covered by the mask;
  inpainting the mask to produce an inpainted mask having a restored background portion of the image; and
  overlaying the inpainted mask with the costume to produce the enhanced image.

* * * * *